United States Patent
Nakata et al.

(10) Patent No.: US 11,926,319 B2
(45) Date of Patent: Mar. 12, 2024

(54) DRIVING MONITORING DEVICE AND COMPUTER READABLE MEDIUM

(71) Applicant: Mitsubishi Electric Corporation, Tokyo (JP)

(72) Inventors: Haruo Nakata, Tokyo (JP); Masahiko Tanimoto, Tokyo (JP); Yosuke Ishiwatari, Tokyo (JP); Masahiro Abukawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 799 days.

(21) Appl. No.: 17/001,392

(22) Filed: Aug. 24, 2020

(65) Prior Publication Data
US 2020/0384990 A1    Dec. 10, 2020

Related U.S. Application Data

(63) Continuation of application No. PCT/JP2018/016312, filed on Apr. 20, 2018.

(51) Int. Cl.
*B60W 30/095*  (2012.01)
*B60W 30/085*  (2012.01)

(52) U.S. Cl.
CPC ...... *B60W 30/0956* (2013.01); *B60W 30/085* (2013.01); *B60W 30/0953* (2013.01);
(Continued)

(58) Field of Classification Search
CPC ........... B60W 30/0956; B60W 30/085; B60W 30/0953; B60W 2554/4041;
(Continued)

(56) References Cited

U.S. PATENT DOCUMENTS

| | | | |
|---|---|---|---|
| 2004/0085197 A1 | 5/2004 | Watanabe et al. | |
| 2004/0193347 A1* | 9/2004 | Harumoto | G08G 1/16 701/45 |

(Continued)

FOREIGN PATENT DOCUMENTS

| | | |
|---|---|---|
| EP | 0 982 173 A2 | 3/2000 |
| JP | 10-283593 A | 10/1998 |

(Continued)

OTHER PUBLICATIONS

International Search Report for PCT/JP2018/016312 dated Jun. 19, 2018.

*Primary Examiner* — Santiago Garcia
(74) *Attorney, Agent, or Firm* — Birch, Stewart, Kolasch & Birch, LLP

(57) ABSTRACT

A driving monitoring device (100) decides an applicable collision pattern that applies to a collision pattern of a case where a vehicle (200) collides with a mobile object, based on a velocity vector of the vehicle, a velocity vector of the mobile object, and so on. Subsequently, the driving monitoring device calculates a time until collision, which is a time taken until the vehicle collides with the mobile object, in the applicable collision pattern. Then, the driving monitoring device calculates a danger level of an accident in which the vehicle collides with the mobile object, based on the applicable collision pattern and the time until collision.

16 Claims, 10 Drawing Sheets

(52) U.S. Cl.
CPC ............... *B60W 2554/4041* (2020.02); *B60W 2554/4042* (2020.02); *B60W 2554/4044* (2020.02); *B60W 2554/4045* (2020.02)

(58) Field of Classification Search
CPC . B60W 2554/4042; B60W 2554/4044; B60W 2554/4045; B60W 2050/143; B60W 2520/10; B60W 2554/20; B60W 2554/802; B60W 2556/40; B60W 2720/106; B60W 2720/24; B60W 50/14; B60W 30/09; B60W 1/16
See application file for complete search history.

(56) References Cited

U.S. PATENT DOCUMENTS

| | | | | |
|---|---|---|---|---|
| 2005/0107955 | A1* | 5/2005 | Isaji | B60W 30/08 340/436 |
| 2005/0179580 | A1* | 8/2005 | Cong | G01S 13/723 342/107 |
| 2006/0106538 | A1* | 5/2006 | Browne | B60R 21/01 701/301 |
| 2006/0282218 | A1* | 12/2006 | Urai | B60W 30/095 340/436 |
| 2007/0080825 | A1* | 4/2007 | Shiller | B62D 15/029 340/903 |
| 2008/0288140 | A1 | 11/2008 | Matsuno | |
| 2009/0192710 | A1* | 7/2009 | Eidehall | B60W 50/0097 701/300 |
| 2010/0076621 | A1 | 3/2010 | Kubotani et al. | |
| 2010/0106356 | A1* | 4/2010 | Trepagnier | G05D 1/0248 701/25 |
| 2011/0187515 | A1 | 8/2011 | Saito et al. | |
| 2016/0059855 | A1* | 3/2016 | Rebhan | B60W 30/0956 701/41 |
| 2016/0101779 | A1* | 4/2016 | Katoh | B60W 30/095 340/435 |
| 2016/0114800 | A1* | 4/2016 | Shimizu | B60W 30/18027 701/70 |
| 2016/0224849 | A1 | 8/2016 | Sakagami et al. | |
| 2017/0015315 | A1* | 1/2017 | Hattori | B60R 21/0132 |
| 2017/0120803 | A1* | 5/2017 | Kentley | G01C 21/32 |
| 2017/0210381 | A1* | 7/2017 | Nishimura | B60W 30/09 |
| 2017/0240186 | A1 | 8/2017 | Hatano | |
| 2017/0274876 | A1* | 9/2017 | Kim | G01S 15/87 |
| 2018/0118203 | A1* | 5/2018 | Minemura | G08G 1/166 |
| 2018/0286242 | A1* | 10/2018 | Talamonti | B62D 15/025 |

FOREIGN PATENT DOCUMENTS

| | | |
|---|---|---|
| JP | 2000-99899 A | 4/2000 |
| JP | 3145740 B2 | 3/2001 |
| JP | 2002-163796 A | 6/2002 |
| JP | 2006-127491 A | 5/2006 |
| JP | 2009-87062 A | 4/2009 |
| JP | 2009-175814 A | 8/2009 |
| JP | 2010-72969 A | 4/2010 |
| JP | 2011-221667 A | 11/2011 |
| JP | 4980076 B2 | 7/2012 |
| JP | 4993429 B2 | 8/2012 |
| JP | 5070171 B2 | 11/2012 |
| JP | 2014-154004 A | 8/2014 |
| JP | 2014-203168 A | 10/2014 |
| JP | 2015-60522 A | 3/2015 |
| JP | 5691237 B2 | 4/2015 |
| JP | 2016-145020 A | 8/2016 |
| JP | 2017-134520 A | 8/2017 |
| JP | 2017-146819 A | 8/2017 |
| JP | 6171499 B2 | 8/2017 |
| JP | 2017-182563 A | 10/2017 |
| JP | 2018-5441 A | 1/2018 |
| WO | WO 2008/126389 A1 | 10/2008 |

* cited by examiner

DRIVING MONITORING DEVICE AND COMPUTER READABLE MEDIUM

CROSS REFERENCE TO RELATED APPLICATION

This application is a Continuation of PCT International Application No. PCT/JP2018/016312, filed on Apr. 20, 2018, which is hereby expressly incorporated by reference into the present application.

TECHNICAL FIELD

The present invention relates to a technique for monitoring the operation of a vehicle.

BACKGROUND ART

When another vehicle or a pedestrian suddenly makes a motion change, a vehicle's driver often fails to respond to it, and a crash accident is resulted.

Conventionally, a method is known according to which when another vehicle or a pedestrian approaches a vehicle, the vehicle is decelerated automatically, collision is avoided by steering, or the vehicle's driver is alerted with warning.

However, on a high traffic road, the vehicle's driver is alerted frequently or the vehicle is frequently automatically controlled, which is considered to prevent the driver from driving comfortably.

In view of this, a method has been proposed according to which another vehicle or the pedestrian is detected only when the danger level is high, and the driver is alerted or vehicle control is reduced when the danger level is low.

Patent Literature 1 discloses a method as follows.

First, a danger level of another vehicle is calculated based on an actual behavior of another vehicle following a behavior of a vehicle. Then, when the danger level is equal to or more than a threshold, the driving plan of the vehicle is changed such that the driving operation is favorable from the point of view of another vehicle.

In this method, the danger level of another vehicle is calculated based on the actual behavior of another vehicle following the behavior of the vehicle. Thus, when another movement performs an unanticipated motion, a corresponding danger level is not calculated.

Patent Literature 2 discloses a method as follows.

In a case where an object (another vehicle, a pedestrian, or the like) existing in the vicinity of a vehicle makes a sudden motion change in a direction that leads to the highest danger level for the vehicle, a margin degree is calculated for reducing a potential risk to a certain level or less, based on a magnitude of a minimum necessary velocity change vector of the vehicle, and based on a maximum acceleration of the vehicle. Then, the vehicle is caused to change its motion in a direction to match a larger margin degree.

Specifically, a potential risk level is assessed in 4 levels based on a magnitude of a relative velocity vector of another vehicle and a distance between the two vehicles. If the potential risk level is level 3 or more, a minimum necessary velocity change vector of the vehicle for reducing the potential risk level to level 2 or less is calculated in a plurality of directions. Then, a margin degree is calculated based on the magnitudes of the calculated velocity change vectors and the maximum acceleration of the vehicle.

A motion change in a direction to match the larger margin degree is selected, but economic or human damage on the vehicle side is not taken into consideration. As a result, suitable warning or suitable evasive motion cannot be made.

CITATION LIST

Patent Literature

Patent Literature 1: JP 2015-060522 A
Patent Literature 2: Japanese Patent No. 4993429

SUMMARY OF INVENTION

Technical Problem

It is an objective of the present invention to make it possible to obtain a danger level suitable as a danger level of an accident in which a vehicle collides with a mobile object.

Solution to Problem

A driving monitoring device according to the present invention includes:
  a collision pattern decision unit to decide an applicable collision pattern that applies to a collision pattern of a case where a vehicle collides with a mobile object, based on a velocity vector of the vehicle, a velocity vector of the mobile object, a distance from the vehicle to the mobile object, an acceleration performance of the vehicle, an anticipated acceleration performance of the mobile object, and a time until sensing that is taken until the vehicle senses deceleration of the mobile object;
  a time-until-collision calculation unit to calculate a time until collision which is a time taken until the vehicle collides with the mobile object in the applicable collision pattern; and
  a danger level calculation unit to calculate a danger level of an accident in which the vehicle collides with the mobile object, based on the applicable collision pattern and the time until collision.

Advantageous Effects of Invention

According to the present invention, an applicable collision pattern that applies to a collision pattern of a case where a vehicle collides with a mobile object is decided, and a danger level is calculated based on the applicable collision pattern. Therefore, a more suitable danger level can be obtained.

DESCRIPTION OF EMBODIMENTS

Figure 1:
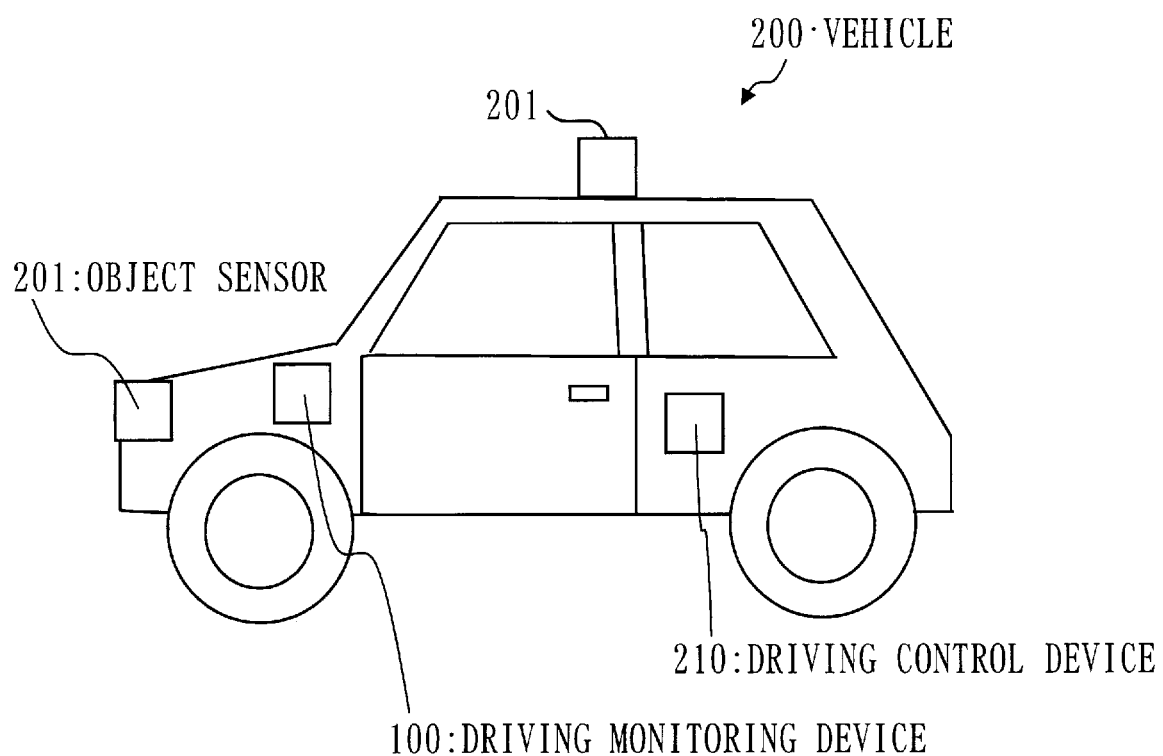
FIG. 1 is a configuration diagram of a vehicle 200 in Embodiment 1.

In the embodiments and drawings, the same elements and equivalent elements are denoted by the same reference sign. Description of an element denoted by the same reference sign will be appropriately omitted or simplified. Arrows in the drawings mainly indicate data flows or process flows.

Embodiment 1

A driving monitoring device 100 which monitors driving of a vehicle 200 will be described with referring to FIGS. 1 to 6.

*Description of Configuration*

A configuration of the vehicle 200 will be described with referring to FIGS. 1 and 2.

FIG. 1 illustrates a side surface of the vehicle 200. FIG. 2 illustrates a windshield portion of the vehicle 200.

Object sensors 201, a monitoring camera 202, a driving control device 210, and the driving monitoring device 100 are mounted in the vehicle 200. In addition, a display, a speaker, and so on are mounted in the vehicle 200.

The object sensor 201 is a sensor to detect a mobile object existing in a vicinity of the vehicle 200. For example, the object sensor 201 is a laser sensor.

The monitoring camera 202 is a camera to pick up an image of the vicinity of the vehicle 200. The monitoring camera 202 is used as a sensor to detect the mobile object existing in the vicinity of the vehicle 200, just as the object sensor 201 does.

Specifically, the mobile object is a vehicle traveling in the vicinity of the vehicle 200. An automobile, a motorcycle, and a bicycle are examples of the vehicle. The mobile object may be an object other than a vehicle, such as a pedestrian and an animal.

The driving control device 210 is a computer which controls driving of the vehicle 200.

Specifically, the driving control device 210 accelerates or decelerates the vehicle 200, and controls steering of the vehicle 200.

The object sensor 201, the monitoring camera 202, the driving control device 210, the display, the speaker, and so on are connected to the driving monitoring device 100.

A configuration of the driving monitoring device 100 will be described with referring to FIG. 3.

The driving monitoring device 100 is a computer provided with hardware devices such as a processor 101, a memory 102, an auxiliary storage device 103, and an input/output interface 104. These hardware devices are connected to each other via signal lines.

The processor 101 is an Integrated Circuit (IC) which performs arithmetic processing, and controls the other hardware devices. For example, the processor 101 is a Central Processing Unit (CPU), a Digital Signal Processor (DSP), or a Graphics Processing Unit (GPU).

The memory 102 is a volatile storage device. The memory 102 is called a main storage device or a main memory as well. For example, the memory 102 is a Random-Access Memory (RAM). Data stored in the memory 102 is saved in the auxiliary storage device 103 as necessary.

The auxiliary storage device 103 is a nonvolatile storage device. For example, the auxiliary storage device 103 is a Read-Only Memory (ROM), a Hard Disk Drive (HDD), or a flash memory. Data stored in the auxiliary storage device 103 is loaded in the memory 102 as necessary.

The input/output interface 104 is a port to which various types of apparatuses are connected. Specifically, the object sensors 201, the monitoring camera 202, the driving control device 210, the display, the speaker, and so on are connected to the input/output interface 104.

The driving monitoring device 100 is provided with elements such as an object detection unit 111, a collision pattern decision unit 112, a time-until-collision calculation unit 113, a danger level calculation unit 114, a control decision unit 115, and a warning unit 116. These elements are implemented by software.

In the auxiliary storage device 103, a driving monitoring program to cause the computer to function as the object detection unit 111, the collision pattern decision unit 112, the time-until-collision calculation unit 113, the danger level calculation unit 114, the control decision unit 115, and the warning unit 116 is stored. The driving monitoring program is loaded in the memory 102 and executed by the processor 101.

Furthermore, an Operating System (OS) is stored in the auxiliary storage device 103. The OS is at least partly loaded in the memory 102 and executed by the processor 101.

That is, the processor 101 executes the driving monitoring program while executing the OS.

Data obtained by executing the driving monitoring program is stored in a storage device such as the memory 102, the auxiliary storage device 103, a register in the processor 101, and a cache memory in the processor 101.

The memory 102 functions as a storage unit 120 which stores various types of data used in the driving monitoring device 100. Note that another storage device may function as the storage unit 120 in place of the memory 102 or along with the memory 102.

The driving monitoring device 100 may be provided with a plurality of processors that substitute for the processor 101. The plurality of processors share a role of the processor 101.

The driving monitoring program can be computer readably recorded (stored) in a nonvolatile recording medium such as an optical disk and a flash memory.

*Description of Operations*

Operations of the driving monitoring device 100 correspond to a driving monitoring method. A procedure of the driving monitoring method corresponds to a procedure of the driving monitoring program.

The driving monitoring method will be described with referring to FIG. 4.

Step S110 to step S190 are executed repeatedly.

In step S110, the object detection unit 111 detects a mobile object existing in the vicinity of the vehicle 200.

When a plurality of mobile objects exist in the vicinity of the vehicle 200, the object detection unit 111 detects the plurality of mobile objects.

Specifically, the object detection unit 111 measures a relative position vector of the mobile object and a size of the mobile object on the basis of sensor data obtained by the object sensor 201 or on image data obtained by the monitoring camera 202.

Furthermore, the object detection unit 111 calculates a relative velocity vector of the mobile object using a plurality of relative position vectors of the mobile object at a plurality of time points. Then, the object detection unit 111 calculates a velocity vector of the mobile object using a velocity vector of the vehicle 200 and the relative velocity vector of the mobile object. The velocity vector of the mobile object is obtained by adding the relative velocity vector of the mobile object to the velocity vector of the vehicle 200.

The object detection unit 111 also decides a type of the mobile object based on the size of the mobile object.

The relative position vector of the mobile object indicates a distance from the vehicle 200 to the mobile object and a direction in which the mobile object is located from the vehicle 200 as an origin. That is, the relative position vector of the mobile object expresses a position of the mobile object relative to the vehicle 200.

The velocity vector of the vehicle 200 indicates a velocity of the vehicle 200 and a direction in which the vehicle 200 travels. The velocity vector of the vehicle 200 is obtained, for example, from the driving control device 210.

The velocity vector of the mobile object expresses a velocity of the mobile object and a direction in which the mobile object travels. The size of the mobile object is expressed, for example, by a vertical length of the mobile object and a horizontal length of the mobile object.

The type of the mobile object is, for example, an automobile, a motorcycle, a bicycle, a pedestrian, or an animal. For example, object type data is stored in the storage unit 120 in advance. The object type data correlates a plurality of size ranges and a plurality of object types with each other. The object detection unit 111 selects a size range that contains the size of the mobile object from the object type data, and selects an object type correlated with the selected size range from the object type data. The object type that is selected is the type of the mobile object.

Step S120 to step S140 are executed for each mobile object detected in step S110.

In step S120, the collision pattern decision unit 112 decides an applicable collision pattern that applies to a collision pattern of a case where the vehicle 200 collides with a mobile object.

Specifically, the collision pattern decision unit 112 decides the applicable collision pattern based on the velocity vector of the vehicle 200, the velocity vector of the mobile object, the distance from the vehicle 200 to the mobile object, an acceleration performance of the vehicle 200, an anticipated acceleration performance of the mobile object, and a time until sensing.

The time until sensing is a time that is taken until the vehicle 200 senses deceleration of a mobile object. For example, deceleration of the mobile object is sensed by the object detection unit 111 based on the sensor data.

The velocity vector of the vehicle 200 is obtained, for example, from the driving control device 210.

The velocity vector of the mobile object is obtained in step S110.

The distance from the vehicle 200 to the mobile object is obtained in step S110.

The acceleration performance of the vehicle 200 is stored in the storage unit 120 in advance. The acceleration performance signifies an acceleration capability and a deceleration capability. The acceleration performance is expressed by a maximum acceleration. The maximum acceleration is a maximum value of a magnitude of the acceleration.

The anticipated acceleration performance of the mobile object is stored in the storage unit 120 in advance. For example, anticipated acceleration performance data is stored in the storage unit 120 in advance. The anticipated acceleration performance data correlates the plurality of object types and a plurality of anticipated acceleration performances with each other. The collision pattern decision unit 112 selects an anticipated acceleration performance correlated with the type of the mobile object from the anticipated acceleration performance data. The anticipated acceleration performance that is selected is the anticipated acceleration performance of the mobile object.

The time until sensing is stored in the storage unit 120 in advance.

Specifically, the collision pattern decision unit 112 decides one of first collision pattern to fourth collision pattern as the applicable collision pattern.

The first collision pattern is a pattern in which before the vehicle 200 senses deceleration of the mobile object, the vehicle 200 collides with the mobile object that is decelerating.

The second collision pattern is a pattern in which after the vehicle 200 senses deceleration of the mobile object, the vehicle 200 collides with the mobile object that is decelerating.

The third collision pattern is a pattern in which before the vehicle 200 senses deceleration of the mobile object, the vehicle 200 collides with the mobile object that is stopped.

The fourth collision pattern is a pattern in which after the vehicle 200 senses deceleration of the mobile object, the vehicle 200 collides with the mobile object that is stopped.

Conditions of the individual collision patterns will be indicated below where:

$v_0$ is a velocity vector of the vehicle 200;

$v_r$ is a velocity vector of the mobile object;

$d_0$ is a distance from the vehicle 200 to the mobile object;

$a_0$ is a maximum acceleration of the vehicle 200;

$a_r$ is a maximum acceleration of the mobile object; and $a_t$ is a time until sensing.

When a condition indicated by equation (1-1) is satisfied, the collision pattern decision unit 112 decides the first collision pattern as the applicable collision pattern.

[Formula 1]

Condition of First Collision Pattern $$v_r \geq v_0 - \sqrt{v_0^2 + 2a_r d_0} \text{ and } v_r \leq v_0 - \frac{1}{2}a_r t_l - \frac{d_0}{t_l} \quad \text{Equation (1-1)}$$

When a condition indicated by equation (1-2) is satisfied, the collision pattern decision unit 112 decides the second collision pattern as the applicable collision pattern.

[Formula 2]

Condition of Second Collision Pattern $$\frac{a_r}{a_r + a_0}\left\{(v_0 - a_0 t_l) - \sqrt{(a_0 t_l - v_0)^2 - (a_r + a_0)(a_0 t_l^2 + 2d_0)}\right\} \leq$$

$$v_r \leq \frac{a_r}{a_r + a_0}$$

$$\left\{(v_0 - a_0 t_l) + \sqrt{(a_0 t_l - v_0)^2 - (a_r + a_0)(a_0 t_l^2 + 2d_0)}\right\}$$

(Equation 1-2)

When a condition indicated by equation (1-3) is satisfied, the collision pattern decision unit 112 decides the third collision pattern as the applicable collision pattern.

[Formula 3]
Condition of Third Collision Pattern $$v_r \leq v_0 - \sqrt{v_0^2 + 2a_r d_0} \text{ and } v_r \leq \sqrt{2a_r(d_0 - v_0 t_l)} \quad \text{Equation (1-3)}$$

When a condition indicated by equation (1-4) is satisfied, the collision pattern decision unit 112 decides the fourth collision pattern as the applicable collision pattern.

[Formula 4]
Condition of Fourth Collision Pattern $$v_r \geq \sqrt{2a_r(d_0 - v_0 t_l)}$$

and $$v_r \leq \frac{a_r}{a_r + a_0} \left\{ (v_0 - a_0 t_l) - \sqrt{(a_0 t_l - v_0)^2 - (a_r + a_0)(a_0 t_l^2 + 2d_0)} \right\}$$

or $$v_r \geq \frac{a_r}{a_r + a_0} \left\{ (v_0 - a_0 t_l) + \sqrt{(a_0 t_l - v_0)^2 - (a_r + a_0)(a_0 t_l^2 + 2d_0)} \right\}$$

Equation (1-4)

In step S130, the time-until-collision calculation unit 113 calculates a time until collision.

The time until collision is a time that is taken until the vehicle 200 collides with the mobile object in the applicable collision pattern.

Specifically, the time-until-collision calculation unit 113 calculates the time until collision based on the velocity vector of the vehicle 200, the velocity vector of the mobile object, the distance from the vehicle 200 to the mobile object, the acceleration performance of the vehicle 200, and the anticipated acceleration performance of the mobile object.

Equations for calculating the time until collision will be indicated below where:
$v_0$ is a velocity vector of the vehicle 200;
$v_\gamma$ is a velocity vector of the mobile object;
$d_0$ is a distance from the vehicle 200 to the mobile object;
$a_0$ is a maximum acceleration of the vehicle 200;
$a_\gamma$ is a maximum acceleration of the mobile object; and
$\delta t$ is a time until collision.

When the applicable collision pattern is the first collision pattern, the time-until-collision calculation unit 113 calculates the time until collision by executing equation (2-1).

[Formula 5]
Case of First Collision Pattern $$\delta t = \frac{(v_0 - v_r) \pm \sqrt{(v_0 - v_r)^2 - 2a_r d_0}}{a_r} \quad \text{(Equation 2-1)}$$

When the applicable collision pattern is the second collision pattern, the time-until-collision calculation unit 113 calculates the time until collision by executing equation (2-2).

[Formula 6]
Case of Second Collision Pattern $$\delta t = \frac{-(a_r t_l - v_0 + v_r) \pm \sqrt{a_0 a_r t_l^2 - 2d_0(a_0 - a_r) - 2a_r t_l(v_0 - v_r) + (v_0 - v_r)^2}}{a_0 - a_r} \quad \text{Equation (2-2)}$$

When the applicable collision pattern is the third collision pattern, the time-until-collision calculation unit 113 calculates the time until collision by executing

[Formula 7]
Case of Third Collision Pattern $$\delta t = \frac{d_0 - \frac{v_r^2}{2a_r}}{v_0} \quad \text{Equation (2-3)}$$

When the applicable collision pattern is the fourth collision pattern, the time-until-collision calculation unit 113 calculates the time until collision by executing equation (2-4).

[Formula 8]
Case of Fourth Collision Pattern $$\delta t = \frac{(a_0 t_l - v_0) \pm \sqrt{(v_0 - a_0 t_l)^2 - 2a_0\left(\frac{v_r^2}{2a_r} + \frac{a_0 t_l^2}{2} - d_0\right)}}{a_0} \quad \text{Equation (2-4)}$$

The time until collision calculated by each of equation (2-1) to equation (2-4) corresponds to a minimum time taken in all directions of the vehicle 200 until the vehicle 200 collides with the mobile object.

Figure 5:
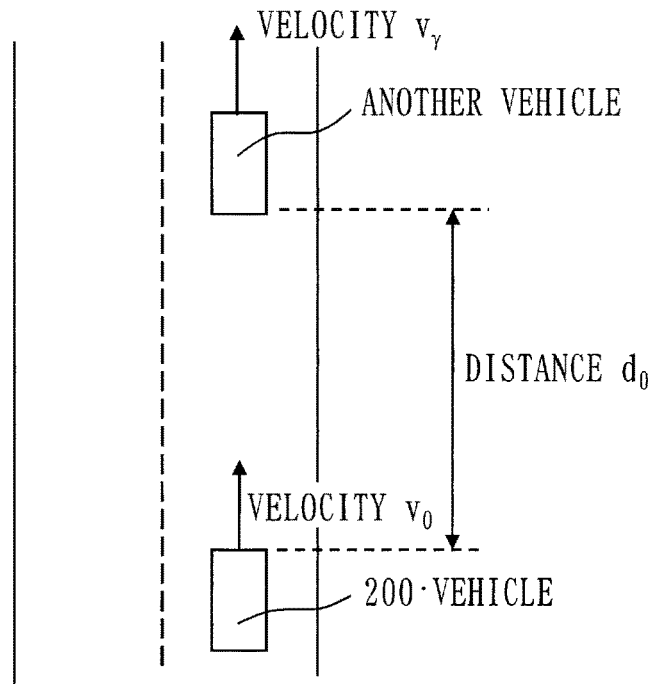
FIG. 5 is a diagram illustrating an example of movement of another vehicle in Embodiment 1.
Figure 5:
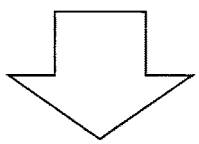
Figure 5:
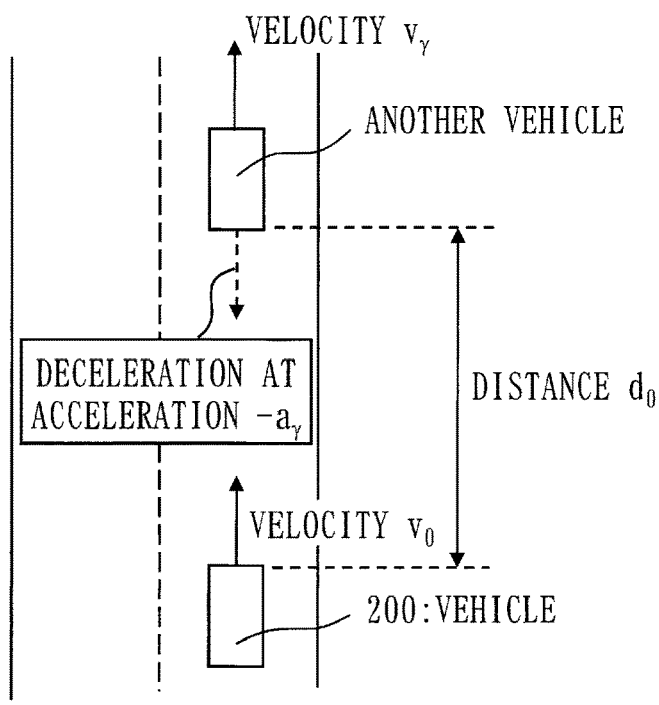

FIG. 5 illustrates how another vehicle traveling ahead of the vehicle 200 decelerates at an acceleration $-a_\gamma$.

Figure 6:
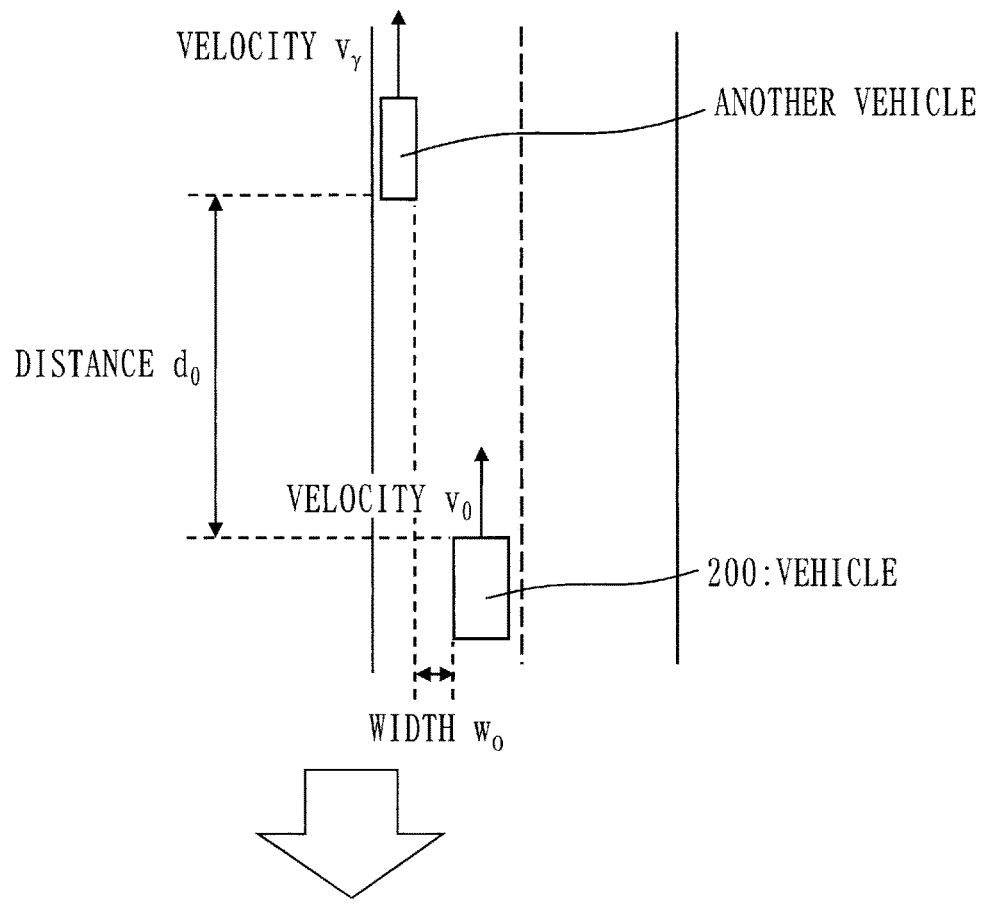
FIG. 6 is a diagram illustrating an example of movement of another vehicle in Embodiment 1.
Figure 6:
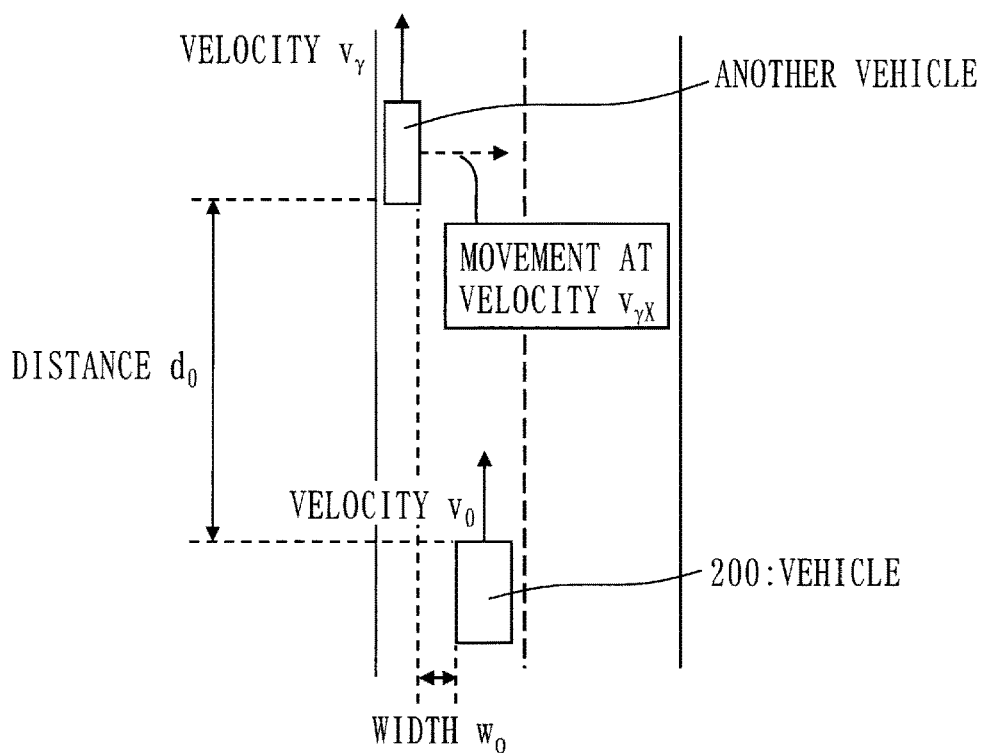

FIG. 6 illustrates how another vehicle traveling on the left side ahead of the vehicle 200 moves to the right at a velocity $v_{\gamma x}$.

Another vehicle is an example of the mobile object.

Figure 4:
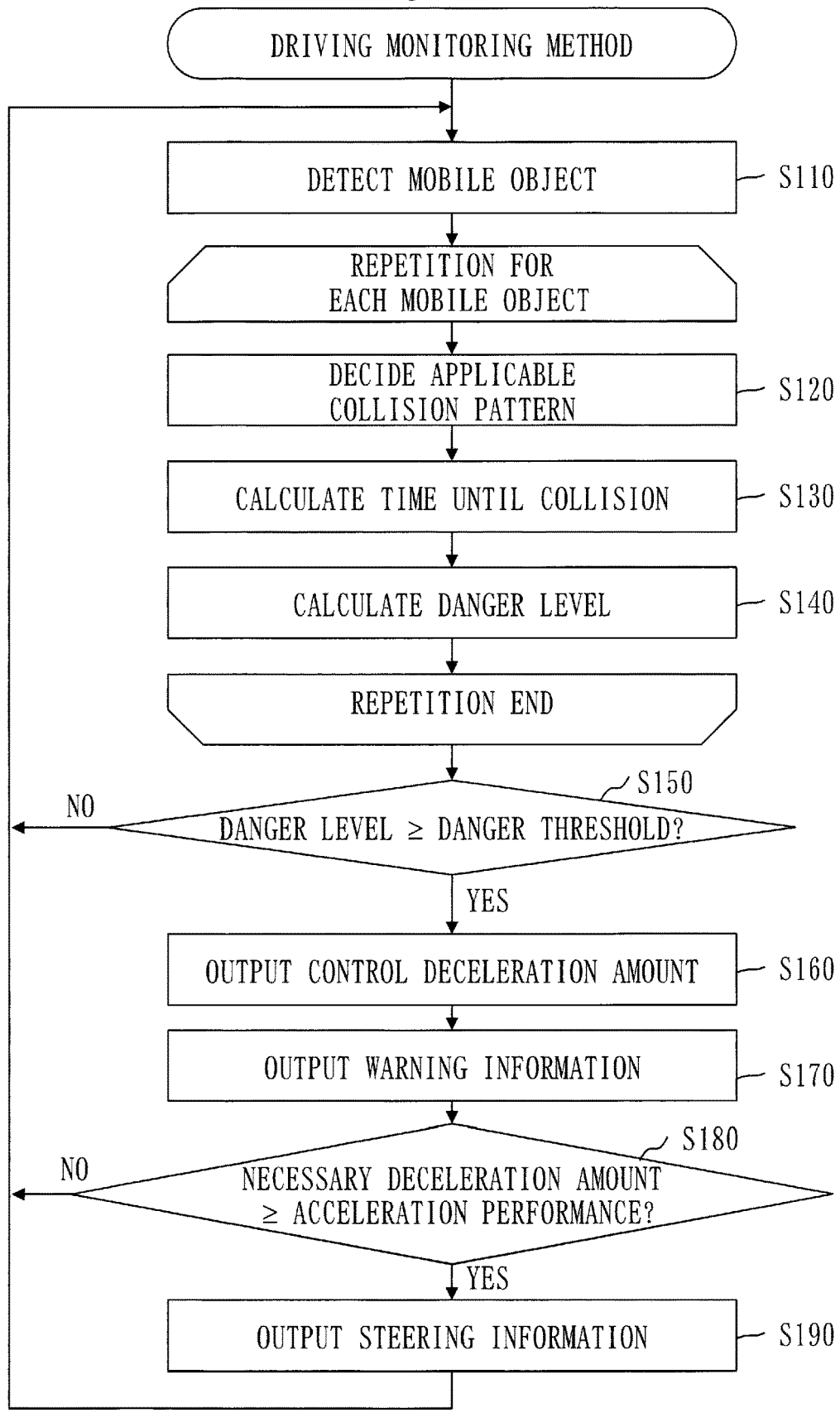
FIG. 4 is a flowchart of a driving monitoring method in Embodiment 1.

Back to FIG. 4, the description will continue from step S140.

In step S140, the danger level calculation unit 114 calculates a danger level of an accident in which the vehicle 200 collides with the mobile object, based on the applicable collision pattern and the time until collision.

The danger level corresponds to an anticipated value of a risk that the mobile object approaches the vehicle 200 within a minimum time, that is, an anticipated value of a potential risk that the mobile object collides with the vehicle 200.

Specifically, the danger level calculation unit 114 calculates the danger level using a weighting factor of the applicable collision pattern and the time until collision.

The higher the weighting factor, the higher the danger level. The lower the weighting factor, the lower the danger level. The shorter the time until collision, the higher the danger level. The longer the time until collision, the lower the danger level.

First, the danger level calculation unit 114 acquires a weighting factor of the applicable collision pattern. Specifically, weighting factor data is stored in the storage unit 120 in advance. The weighting factor data correlates the plurality of collision patterns and the plurality of weighting factors with each other. The danger level calculation unit 114 selects a weighting factor correlated with the applicable collision pattern from the weighting factor data. The weighting factor that is selected is the weighting factor of the applicable collision pattern.

Then, the danger level calculation unit 114 calculates the danger level by executing equation (3) where:

R is a danger level;

δt is a time until collision; and w is a weighting factor.

$$R = (1/\delta t) \times w \quad \text{Equation (3)}$$

The weighting factor being set in the weighting factor data will be explained.

In a case of the third collision pattern or the fourth collision pattern, the vehicle 200 collides with the mobile object after the mobile object has stopped. Therefore, it is anticipated that the percentage of fault of the vehicle 200 in the collision is high. Hence, if it is significant to decrease the percentage of fault of the vehicle 200, a weighting factor higher than a standard is set in the weighting factor data as the weighting factor of the third collision pattern or the fourth collision pattern.

In a case of the first collision pattern or the third collision pattern, the vehicle 200 collides with the mobile object before the vehicle 200 senses deceleration of the mobile object. Therefore, it is anticipated that damage to the human on board the vehicle 200 is large. Hence, if it is significant to decrease the damage to the human on board the vehicle 200, a weighting factor higher than a standard is set in the weighting factor data as the weighting factor of the first weighting factor or the third weighting factor.

In short, the weighting factor of each collision pattern is set by taking into consideration economic or human damage.

For this reason, the danger level is a value with economic or human damage being taken into consideration.

In step S150, the danger level calculation unit 114 compares the danger level with a danger threshold. The danger threshold is a value decided in advance.

When a plurality of danger levels are calculated for a plurality of mobile objects, the danger level calculation unit 114 compares the highest danger level among the calculated plurality of danger levels with the danger threshold.

If the danger level is equal to or more than the danger threshold, the processing proceeds to step S160.

If the danger level is less than the danger threshold, the processing proceeds to step S110.

Step S160 to step S190 are executed for a target which is a mobile object that matches the danger level being compared with the danger threshold in step S150.

In step S160, the control decision unit 115 outputs a control deceleration amount to the driving control device 210. The control deceleration amount is expressed by a negative acceleration.

First, the control decision unit 115 calculates a necessary deceleration amount for preventing the vehicle 200 from colliding with the mobile object. The necessary deceleration amount is expressed by a negative acceleration.

Specifically, the control decision unit 115 calculates the necessary deceleration amount by executing equation (4-1) where:

$a_n$ is a magnitude of the necessary deceleration amount being $-a_n$;

$V_0$ is a velocity of the vehicle 200;

$V_\gamma$ is a velocity of the mobile object;

$d_0$ is a distance from the vehicle 200 to the mobile object; and $t_L$ is a time until sensing.

[Formula 9]

$$a_n \geq \frac{V_r^2 - V_0^2}{2(d_0 - V_0 t_l)} \quad \text{Equation (4-1)}$$

Equation (4-1) is obtained by developing equation (4-2).

Equation (4-2) is an equation indicating that for preventing the vehicle 200 from colliding with the mobile object, a velocity V of the vehicle 200 may reach a velocity $V_\gamma$ or less before the vehicle 200 travels a distance $d_0$.

[Formula 10]

$$V \leq V_r = \sqrt{V_0^2 - 2a_n(d_0 + V_0 t_l)} \quad \text{Equation (4-2)}$$

Subsequently, the control decision unit 115 decides the control deceleration amount based on the necessary deceleration amount and the danger level.

If the danger level is relatively low, the control decision unit 115 decreases the magnitude of the control deceleration amount so that the vehicle 200 will not decelerate sharply. On the other hand, if the danger level is high, the control decision unit 115 increases the magnitude of the control deceleration amount.

For example, the control decision unit 115 decides an adjusting deceleration amount based on the danger level, and adds the adjusting deceleration amount to the necessary deceleration amount. A value thus calculated is the control deceleration amount. The higher the danger level, the larger the magnitude of the adjusting deceleration amount. The lower the danger level, the smaller the magnitude of the adjusting deceleration amount.

Then, the control decision unit 115 outputs the control deceleration amount to the driving control device 210.

When the control deceleration amount is outputted to the driving control device 210, the driving control device 210 decelerates the vehicle 200 according to the control deceleration amount. If the magnitude of the control deceleration amount exceeds the acceleration performance of the vehicle 200, the driving control device 210 decelerates the vehicle 200 by the acceleration performance of the vehicle 200.

In step S170, the warning unit 116 outputs warning information.

The warning information is information informing that the vehicle 200 is in danger of colliding with the mobile object.

Specifically, the warning unit 116 outputs the warning information to the display or the speaker. If the warning information is outputted to the display, the display displays the warning information. If the warning information is outputted to the speaker, the speaker provides an audio output of the warning information.

In step S180, the control decision unit 115 compares the magnitude of the necessary deceleration amount with the acceleration performance.

If the magnitude of the necessary deceleration amount is equal to or more than the acceleration performance, it is considered that collision of the vehicle 200 with the mobile object is unavoidable. Hence, the processing proceeds to step S190.

If the magnitude of the necessary deceleration amount is less than the acceleration performance, it is considered that collision of the vehicle 200 with the mobile object is avoidable. Hence, the processing proceeds to step S110.

In step S190, the control decision unit 115 decides a steering direction based on the relative position vector of the mobile object.

The relative position vector of the mobile object is obtained in step S110.

Specifically, the control decision unit 115 decides a steering direction for preventing a particular portion of the vehicle 200 from colliding with the mobile object. The particular portion of the vehicle 200 is, for example, the driver's seat or the front-passenger seat.

Then, the control decision unit 115 outputs steering information to the driving control device 210.

The steering information is information indicating the steering direction.

When the steering information is outputted to the driving control device 210, the driving control device 210 steers the vehicle 200 in the steering direction indicated by the steering information.

Effect of Embodiment 1

An applicable collision pattern that applies to a collision pattern of a case where the vehicle 200 collides with a mobile object is decided, and a danger level is calculated based on the applicable collision pattern. Therefore, a more suitable danger level can be obtained.

It is possible to prevent, avoid, or decrease danger resulting from an unanticipated motion change of the mobile object. Also, it is possible to decrease damage to the vehicle 200 as much as possible.

Embodiment 2

Description will be made on a mode in which a danger level is calculated by taking into consideration a weight ratio of a vehicle 200 to a mobile object, mainly regarding a difference from Embodiment 1.

*Description of Configuration*

Figure 2:
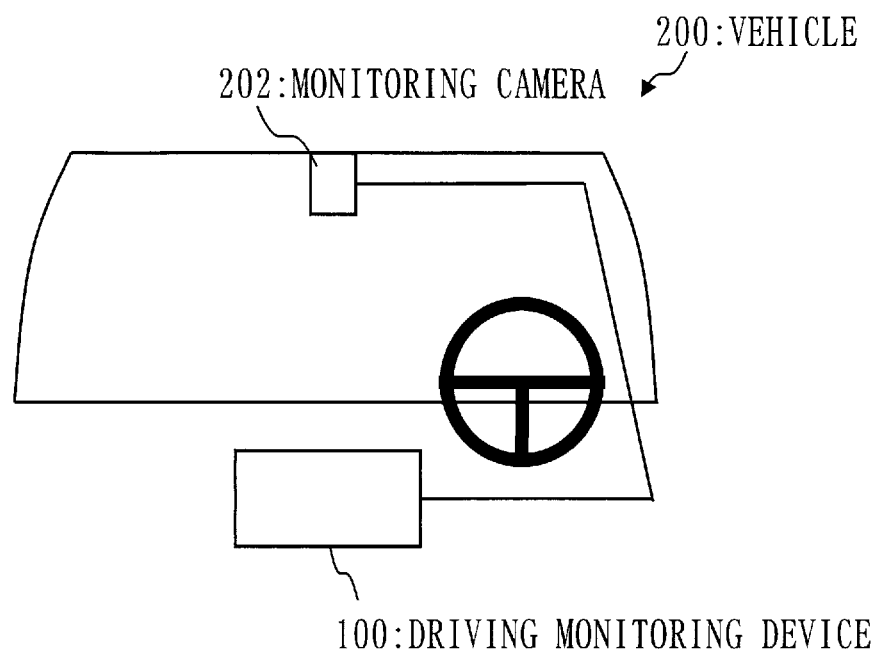
FIG. 2 is a diagram illustrating a windshield portion of the vehicle 200 in Embodiment 1.
Figure 3:
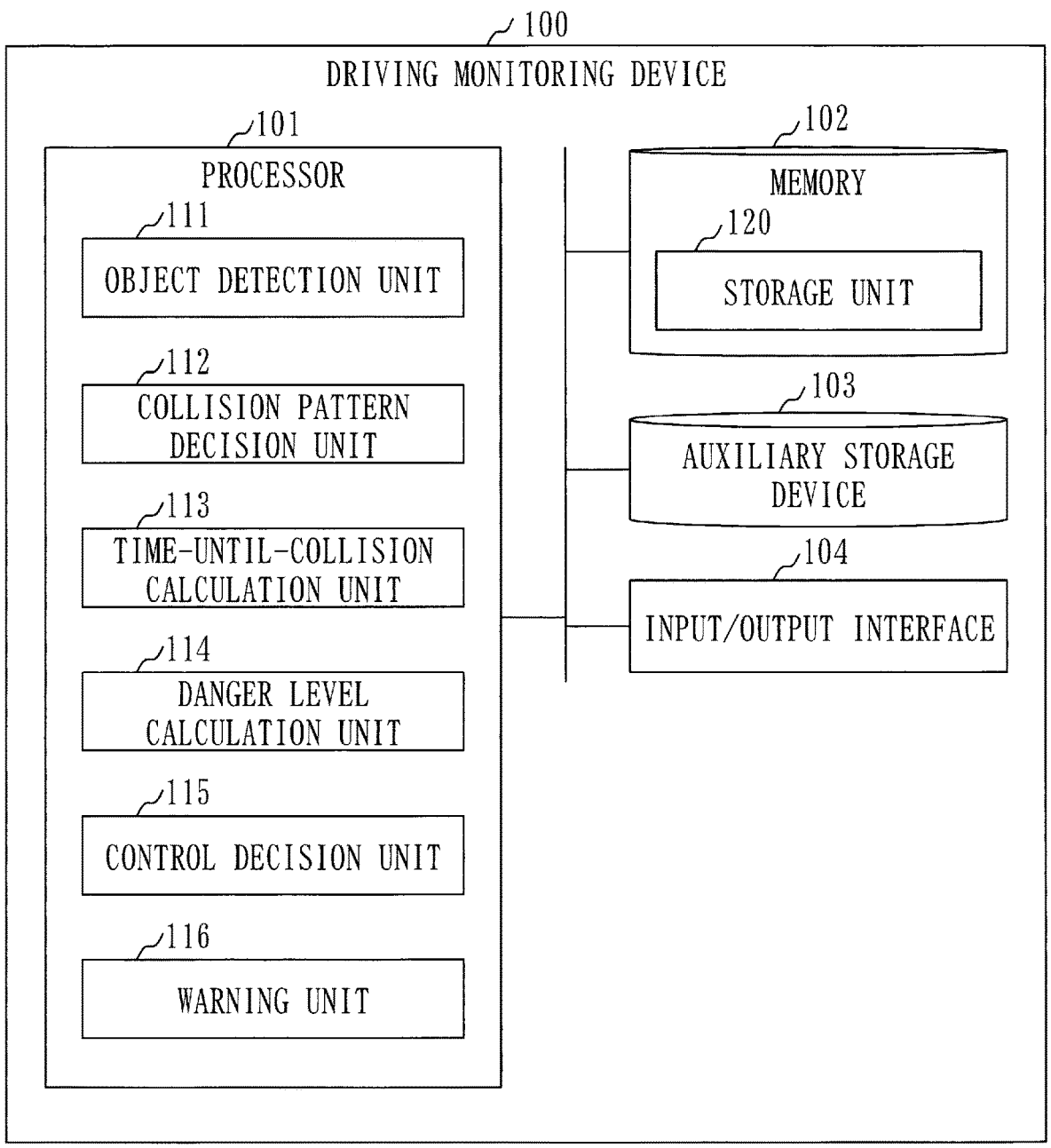
FIG. 3 is a configuration diagram of a driving monitoring device 100 in Embodiment 1.

A configuration of the vehicle 200 and a configuration of a driving monitoring device 100 are the same as the corresponding configurations in Embodiment 1 (see FIGS. 1 to 3).

*Description of Operations*

A procedure of a driving monitoring method is the same as the procedure in Embodiment 1 (see FIG. 4).

Note that in step S140, a danger level is calculated by a method different from the method in Embodiment 1.

In step S140, a danger level calculation unit 114 calculates the danger level as follows.

First, the danger level calculation unit 114 selects a weighting factor correlated with an applicable collision pattern, from weighting factor data. The weighting factor data is stored in a storage unit 120 in advance, as has been described in Embodiment 1.

Subsequently, the danger level calculation unit 114 calculates a weight ratio of a weight of the vehicle 200 to an estimated weight of the mobile object.

The weight of the vehicle 200 is stored in the storage unit 120 in advance.

The estimated weight of the mobile object is stored in the storage unit 120 in advance. For example, estimated weight data is stored in the storage unit 120 in advance. The estimated weight data correlates a plurality of object types and a plurality of estimated weights with each other. Then, the danger level calculation unit 114 selects an estimated weight correlated with the type of the mobile object from the estimated weight data. The estimated weight that is selected is the estimated weight of the mobile object. The type of the mobile object is obtained in step S110.

The weight ratio may be either a ratio of the estimated weight of the mobile object to the weight of the vehicle 200, or a ratio of the weight of the vehicle 200 to the estimated weight of the mobile object.

If emphasis is placed on damage to the vehicle 200, the ratio of the estimated weight of the mobile object to the weight of the vehicle 200 is employed as the weight ratio.

If emphasis is placed on damage to the mobile object, the ratio of the weight of the vehicle 200 to the estimated weight of the mobile object is employed as the weight ratio.

When the weight ratio is the ratio of the estimated weight of the mobile object to the weight of the vehicle 200, the danger level calculation unit 114 calculates the weight ratio by executing equation (5-1).

When the weight ratio is the ratio of the weight of the vehicle 200 to the estimated weight of the mobile object, the danger level calculation unit 114 calculates the weight ratio by executing equation (5-2).

Note that:

$w_m$ is a weight ratio;

$m_0$ is a weight of the vehicle 200; and $m_\gamma$ is an estimated weight of the mobile object.

$$w_m = m_\gamma / m_0 \qquad \text{Equation (5-1)}$$

$$w_m = m_0 / m_\gamma \qquad \text{Equation (5-2)}$$

Then, the danger level calculation unit 114 calculates the danger level using the weighting factor, the time until collision, and the weight ratio.

For example, the danger level calculation unit 114 calculates the danger level by executing equation (6-1) or equation (6-2) where:
R is a danger level;
δt is a time until collision;
w is a weighting factor; and
$w_m$ is a weight ratio.

$$R=(1/\delta t) \times (w \times w_m) \quad \text{Equation (6-1)}$$

$$R=(1/\delta t) \times (w + w_m) \quad \text{Equation (6-2)}$$

Effect of Embodiment 2

The danger level can be calculated by taking into consideration the weight ratio of the vehicle 200 to the mobile object. Hence, a more suitable danger level can be obtained.

Embodiment 3

Description will be made on a mode in which a danger level is calculated by taking into consideration whether or not a stationary object exists between a vehicle 200 and a mobile object, mainly regarding a difference from Embodiment 1 or Embodiment 2.

***Description of Configuration

Figure 7:
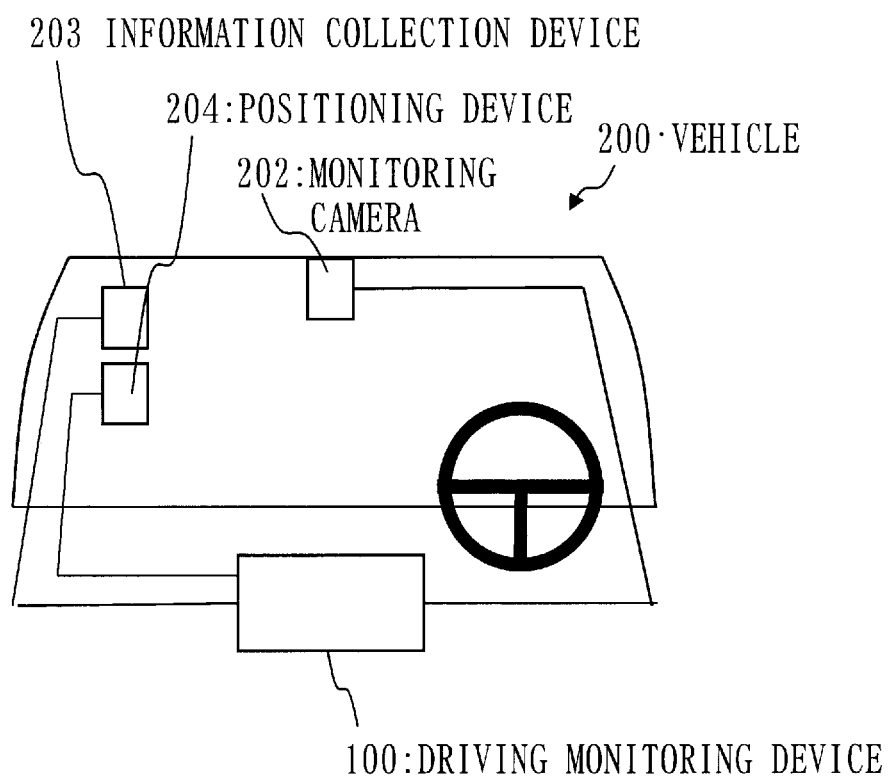
FIG. 7 is a diagram illustrating a windshield portion of a vehicle 200 in Embodiment 3.

FIG. 7 illustrates a windshield portion of the vehicle 200.

An information collection device 203 and a positioning device 204 are further mounted in the vehicle 200.

The information collection device 203 is a device that collects information on a stationary object existing in the vicinity of the vehicle 200. For example, the information collection device 203 is a receiver.

Specifically, the information collection device 203 receives map information. The map information indicates a position, a type, and so on of a stationary object existing at each point. For example, the stationary object is a traffic light, a sign, a utility pole, a guide rail, or the like. The information collection device 203 may receive VICS information in place of the map information or together with the map information. Note that VICS (registered trademark) stands for Vehicle Information and Communication System.

The positioning device 204 positions the vehicle 200. For example, the positioning device 204 is a GPS receiver where GPS stands for Global Positioning System.

The information collection device 203 and the positioning device 204 are connected to a driving monitoring device 100.

Figure 8:
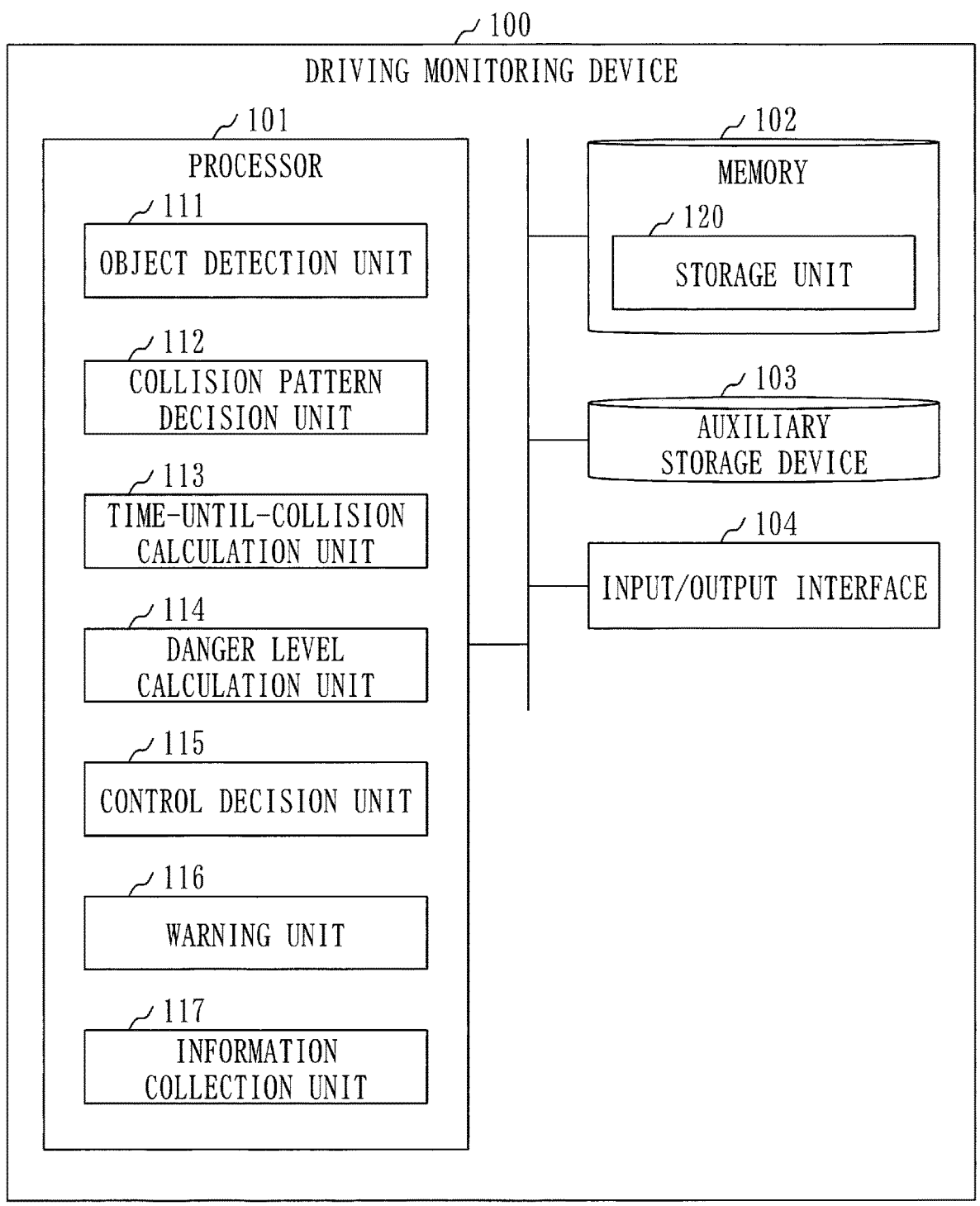
FIG. 8 is a configuration diagram of a driving monitoring device 100 in Embodiment 3.

A configuration of the driving monitoring device 100 will be described with referring to FIG. 8.

The driving monitoring device 100 is further provided with an element which is an information collection unit 117. The information collection unit 117 is implemented by software.

The driving monitoring program causes the computer to function further as the information collection unit 117.

The information collection device 203 is further connected to an input/output interface 104.

*Description of Operations*

Figure 9:
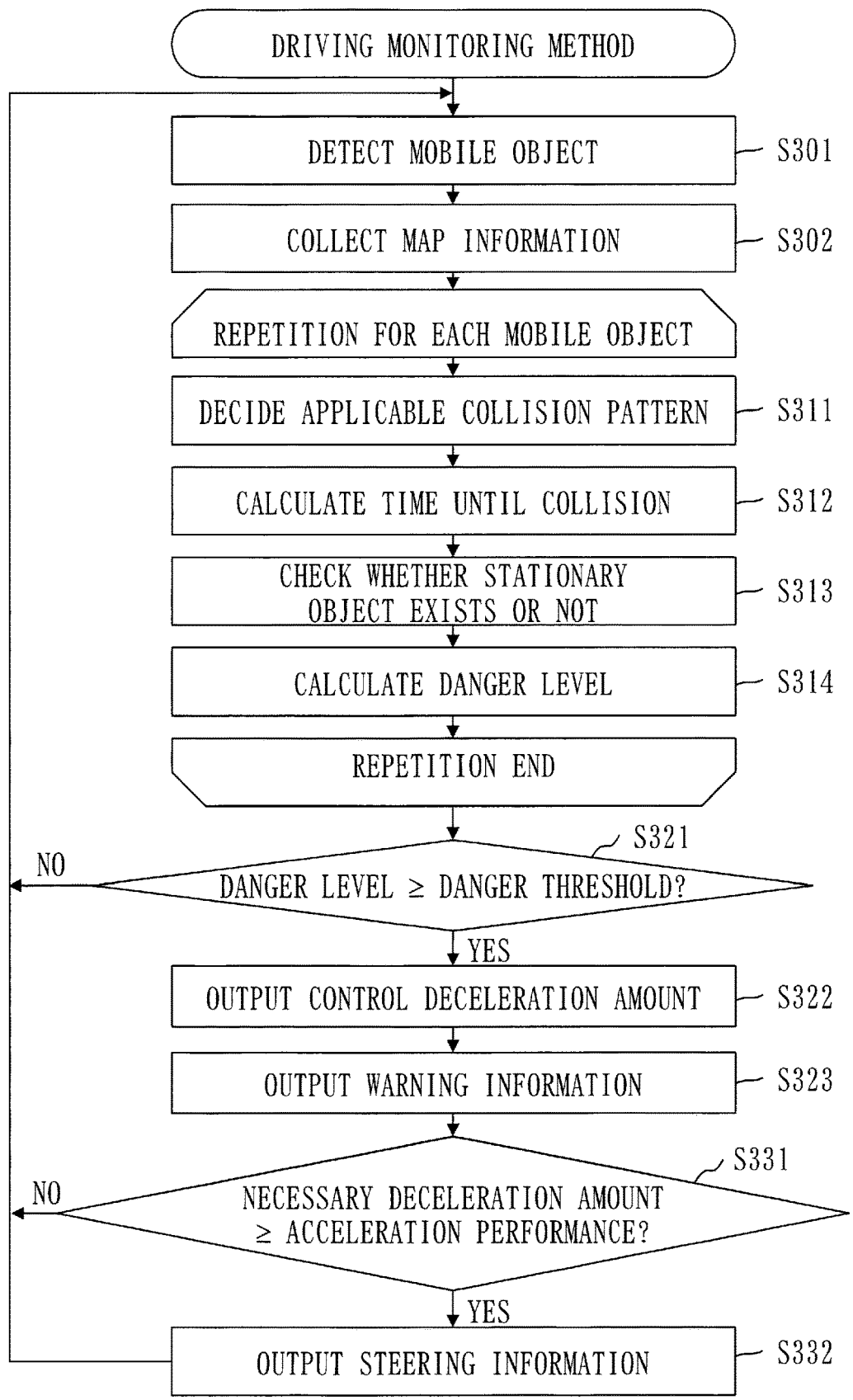
FIG. 9 is a flowchart of a driving monitoring method in Embodiment 3.

A driving monitoring method will be described with referring to FIG. 9.

In step S301, an object detection unit 111 detects a mobile object existing in the vicinity of the vehicle 200.

Step S301 is the same as step S110 in Embodiment 1.

In step S302, the information collection unit 117 collects information on the stationary object existing in the vicinity of the vehicle 200.

Specifically, the information collection unit 117 requests map information from the information collection device 203. The information collection device 203 receives the map information. Then, the information collection unit 117 acquires the map information from the information collection device 203.

In step S311, a collision pattern decision unit 112 decides an applicable collision pattern.

Step S311 is the same as step S120 in Embodiment 1.

In step S312, a time-until-collision calculation unit 113 calculates a time until collision.

Step S312 is the same as step S130 in Embodiment 1.

In step S313, a danger level calculation unit 114 checks whether a stationary object exists between the vehicle 200 and the mobile object, based on positioning information of the vehicle 200, a relative position vector of the mobile object, and the map information.

Specifically, the danger level calculation unit 114 calculates a position of the mobile object using a position of the vehicle 200 and the relative position vector of the mobile object. Then, the danger level calculation unit 114 checks whether a stationary object exists between the vehicle 200 and the mobile object, based on a positional relationship among the position of the vehicle 200, the position of the mobile object, and a position of the stationary object.

The position information of the vehicle 200 is obtained from the positioning device 204.

The relative position vector of the mobile object is obtained in step S301.

The position of the stationary object is indicated in the map information.

The map information is obtained in step S302.

In step S314, the danger level calculation unit 114 calculates a danger level of an accident in which the vehicle 200 collides with the mobile object.

First, the danger level calculation unit 114 decides a weighting factor of the applicable collision pattern based on a checking result of step S313.

When a stationary object exists between the vehicle 200 and the mobile object, it is unlikely that the vehicle 200 collides with the mobile object. Therefore, the danger level calculation unit 114 decides a weight factor for case where a stationary object exists between the vehicle 200 and the mobile object, to be smaller than a weight factor for case where a stationary object does not exist between the vehicle 200 and the mobile object.

For example, the weighting factor data is stored in the storage unit 120 in advance. The weighting factor data correlates the plurality of collision patterns, a plurality of first weighting factors, and a plurality of second weighting factors with each other. The second weighting factors are smaller than the first weighting factors.

If a stationary object does not exist between the vehicle 200 and the mobile object, the danger level calculation unit 114 selects a first weighting factor correlated with an applicable collision pattern from the weighting factor data. The first weighting factor that is selected is used as the weighting factor of the applicable collision pattern.

If a stationary object exists between the vehicle 200 and the mobile object, the danger level calculation unit 114 selects a second weighting factor correlated with the applicable collision pattern from the weighting factor data. The second weighting factor that is selected is used as the weighting factor of the applicable collision pattern.

Then, the danger level calculation unit 114 calculates the danger level using the weighting factor of the applicable collision pattern and the time until collision.

The danger level is calculated by the same method as the method in step S140 of Embodiment 1.

The danger level calculation unit 114 may calculate the danger level using the weight ratio of the weight of the vehicle 200 to an estimated weight of the mobile object, just as in the method in step S140 of Embodiment 2.

Step S321 to step S332 are the same as step S150 to step S190 in Embodiment 1.

Effect of Embodiment 3

The danger level can be calculated by taking into consideration whether or not a stationary object exists between the vehicle 200 and the mobile object. Therefore, a more suitable danger level can be obtained.

Supplement to Embodiments

Figure 10:
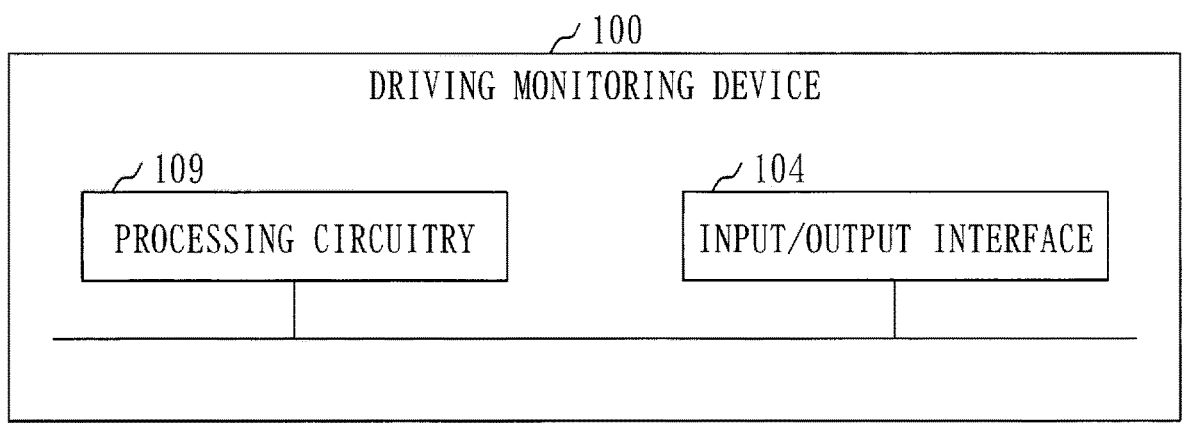
FIG. 10 is a hardware configuration diagram of the driving monitoring device 100 in each embodiment.

A hardware configuration of the driving monitoring device 100 will be described with referring to FIG. 10.

The driving monitoring device 100 is provided with processing circuitry 109.

The processing circuitry 109 is hardware that implements the object detection unit 111, the collision pattern decision unit 112, the time-until-collision calculation unit 113, the danger level calculation unit 114, the control decision unit 115, the warning unit 116, the information collection unit 117, and the storage unit 120.

The processing circuitry 109 may be dedicated hardware, or may be the processor 101 that executes the program stored in the memory 102.

When the processing circuitry 109 is dedicated hardware, the processing circuitry 109 is, for example, a single circuit, a composite circuit, a programmed processor, a parallel-programmed processor, an ASIC, or an FPGA; or a combination of them.

Note that ASIC stands for Application Specific Integrated Circuit, and FPGA stands for Field Programmable Gate Array.

The driving monitoring device 100 may be provided with a plurality of processing circuitries that substitute for the processing circuitry 109. The plurality of processing circuitries share a role of the processing circuitry 109.

In the processing circuitry 109, some of the functions may be implemented by dedicated hardware, and the remaining functions may be implemented by software or firmware.

In this manner, the processing circuitry 109 can be implemented by hardware, software, or firmware; or a combination of them.

The embodiments are exemplifications of preferred modes and are not intended to limit the technical scope of the present invention. Each embodiment may be practiced partly, or may be practiced in combination with another embodiment. Procedures described with using the flowcharts and so on may be changed as necessary.

REFERENCE SIGNS LIST

100: driving monitoring device; 101: processor; 102: memory; 103: auxiliary storage device; 104: input/output interface; 109: processing circuitry; 111: object detection unit; 112: collision pattern decision unit; 113: time-until-collision calculation unit; 114: danger level calculation unit; 115: control decision unit; 116: warning unit; 117: information collection unit; 120: storage unit; 200: vehicle; 201: object sensor; 202: monitoring camera; 203: information collection device; 204: positioning device; 210: driving control device.

The invention claimed is:

1. A driving monitoring device comprising:
processing circuitry
to decide an applicable collision pattern that applies to a collision pattern of a case where a vehicle collides with a mobile object, based on a velocity vector of the vehicle, a velocity vector of the mobile object, a distance from the vehicle to the mobile object, an acceleration performance of the vehicle, an anticipated acceleration performance of the mobile object, and a time until sensing that is taken until the vehicle senses deceleration of the mobile object;
to calculate a time until collision which is a time taken until the vehicle collides with the mobile object in the applicable collision pattern; and
to calculate a danger level of an accident in which the vehicle collides with the mobile object, based on the applicable collision pattern and the time until collision,
wherein the processing circuitry decides, as the applicable collision pattern, one of:
a first collision pattern in which before the vehicle senses deceleration of the mobile object, the vehicle collides with the mobile object that is decelerating;
a second collision pattern in which after the vehicle senses deceleration of the mobile object, the vehicle collides with the mobile object that is decelerating;
a third collision pattern in which before the vehicle senses deceleration of the mobile object, the vehicle collides with the mobile object that is stopped;
a fourth collision pattern in which after the vehicle senses deceleration of the mobile object, the vehicle collides with the mobile object that is stopped.

2. The driving monitoring device according to claim 1, wherein the processing circuitry calculates the danger level using a weighting factor of the applicable collision pattern and the time until collision.

3. The driving monitoring device according to claim 2, wherein the processing circuitry calculates the danger level based on the weighting factor of the applicable collision pattern, the time until collision, and a weight ratio of a weight of the vehicle to an estimated weight of the mobile object.

4. The driving monitoring device according to claim 2, wherein the processing circuitry checks whether a stationary object exists between the vehicle and the mobile Object, based on positioning information of the stationary object, and decides the weighting factor based on a checking result.

5. The driving monitoring device according to claim 1, wherein the processing circuitry calculates, if the danger level is higher than a danger threshold, a necessary deceleration amount for preventing the vehicle from colliding with the mobile object, decides a control deceleration amount based on the necessary deceleration amount and the danger level, and outputs the control deceleration amount to the driving control device of the vehicle.

6. The driving monitoring device according to claim 5, wherein when a magnitude of the necessary deceleration amount exceeds the acceleration performance of the vehicle, the processing circuitry decides a steering direction of the vehicle, and outputs steering information indicating the decided steering direction to the driving control device.

7. The driving monitoring device according to claim 2, wherein the processing circuitry calculates, if the danger level is higher than a danger threshold, a necessary deceleration amount for preventing the vehicle from colliding with the mobile object, decides a control deceleration amount based on the necessary deceleration amount and the danger level, and outputs the control deceleration amount to the driving control device of the vehicle.

8. The driving monitoring device according to claim 7, wherein when a magnitude of the necessary deceleration amount exceeds the acceleration performance of the vehicle, the processing circuitry decides a steering direction of the vehicle, and outputs steering information indicating the decided steering direction to the driving control device.

9. The driving monitoring device according to claim 3 wherein the processing circuitry calculates, if the danger level is higher than a danger threshold, a necessary deceleration amount for preventing the vehicle from colliding with the mobile Object, decides a control deceleration amount based on the necessary deceleration amount and the danger level, and outputs the control deceleration amount to the driving control device of the vehicle.

10. The driving monitoring device according to claim 9, wherein when a magnitude of the necessary deceleration amount exceeds the acceleration performance of the vehicle, the processing circuitry decides a steering direction of the vehicle, and outputs steering information indicating the decided steering direction to the driving control device.

11. The driving monitoring device according to claim 4, wherein the processing circuitry calculates if the danger level is higher than a danger threshold, a necessary deceleration amount for preventing the vehicle from colliding with the mobile object, decides a control deceleration amount based on the necessary deceleration amount and the danger level, and outputs the control deceleration amount to the driving control device of the vehicle.

12. The driving monitoring device according to claim 11, wherein when a magnitude of the necessary deceleration amount exceeds the acceleration performance of the vehicle, the processing circuitry decides a steering direction of the vehicle, and outputs steering information indicating the decided steering direction to the driving control device.

13. The driving monitoring device according to claim 3, wherein the processing circuitry checks whether a stationary object exists between the vehicle and the mobile object, based on positioning information of the stationary object, and decides the weighting factor based on a checking result.

14. The driving monitoring device according to claim 13, wherein the processing circuitry calculates, if the danger level is higher than a danger threshold, a necessary deceleration amount for preventing the vehicle from colliding with the mobile object, decides a control deceleration amount based on the necessary deceleration amount and the danger level, and outputs the control deceleration amount to the driving control device of the vehicle.

15. The driving monitoring device according to claim 14, wherein when a magnitude of the necessary deceleration amount exceeds the acceleration performance of the vehicle, the processing circuitry decides a steering direction of the vehicle, and outputs steering information indicating the decided steering direction to the driving control device.

16. A non-transitory computer readable medium storing a driving monitoring program to cause a computer to execute:
a collision pattern decision process of deciding an applicable collision pattern that applies to a collision pattern of a case where a vehicle collides with a mobile object, based on a velocity vector of the vehicle, a velocity vector of the mobile object, a distance from the vehicle to the mobile object, an acceleration performance of the vehicle, an anticipated acceleration performance of the mobile object, and a time until sensing that is taken until the vehicle senses deceleration of the mobile object;
a time-until-collision calculation process of calculating a time until collision which is a time taken until the vehicle collides with the mobile object in the applicable collision pattern; and
a danger level calculation process of calculating a danger level of an accident in which the vehicle collides with the mobile object, based on the applicable collision pattern and the time until collision,
wherein the collision pattern decision process decides, as the applicable collision pattern, one of:
a first collision pattern in which before the vehicle senses deceleration of the mobile object, the vehicle collides with the mobile object that is decelerating;
a second collision pattern in which after the vehicle senses deceleration of the mobile object, the vehicle collides with the mobile object that is decelerating;
a third collision pattern in which before the vehicle senses deceleration of the mobile object, the vehicle collides with the mobile object that is stopped;
a fourth collision pattern in which after the vehicle senses deceleration of the mobile object, the vehicle collides with the mobile object that is stopped.

* * * * *